United States Patent [19]

Aoki et al.

[11] Patent Number: 5,326,827
[45] Date of Patent: Jul. 5, 1994

[54] HEAT-CURABLE RESIN COMPOSITION CONTAINING ACRYLIC POLYMER HAVING ALICYCLIC EPOXIDE FUNCTIONS

[75] Inventors: Kei Aoki, Ikoma; Shinji Nakano, Takatsuki; Nobuaki Tomita, Nara, all of Japan

[73] Assignee: Nippon Paint Co., Ltd., Osaka, Japan

[21] Appl. No.: 139,076

[22] Filed: Oct. 21, 1993

Related U.S. Application Data

[63] Continuation of Ser. No. 791,507, Nov. 14, 1991, abandoned.

[30] Foreign Application Priority Data

Nov. 14, 1990 [JP] Japan .................................. 2-310000

[51] Int. Cl.$^5$ .............................................. C08F 8/00
[52] U.S. Cl. .................. 525/337; 525/327.3; 525/340; 525/341; 525/344; 525/351; 525/353; 525/355; 525/359.1; 525/385
[58] Field of Search ............... 525/337, 340, 341, 344, 525/351, 353, 355, 359.1, 385

[56] References Cited

U.S. PATENT DOCUMENTS 5,066,722 11/1991 Nakano et al. .
5,070,161 12/1991 Nakano et al. .
5,132,377 7/1992 Nakano et al. .

Primary Examiner—Bernard Lipman
Attorney, Agent, or Firm—Donald E. Townsend

[57] ABSTRACT

A curable resin composition comprising (a) an acrylic polymer having a plurality of alicyclic epoxide functions, and (b) an amount effective to initiate the curing reaction of the acrylic polymer (a) upon heating of a heat-latent cation polymerization initiator. The composition finds its uses in coating compositions, sealants, potting and casting compositions.

7 Claims, No Drawings

HEAT-CURABLE RESIN COMPOSITION CONTAINING ACRYLIC POLYMER HAVING ALICYCLIC EPOXIDE FUNCTIONS

CROSS REFERENCE TO A RELATED APPLICATION

This is a file wrapper continuation application of co-pending application Ser. No. 07/791,507 filed Nov. 14, 1991, now abandoned.

BACKGROUND OF THE INVENTION

This invention relates to a novel resinous composition containing an acrylic polymer having a plurality of alicyclic epoxide functions. The composition may be cured or crosslinked through the cationic polymerization of the epoxide function and is useful as a resinous component of coating compositions, sealants, potting or casting compositions and the like.

Cationic polymerization of epoxy resins using a cationic polymerization initiator is well-known. Usable initiators include Lewis acids, Friedel-Crafts catalyst, boron trifluoride-ether complex, photodegradable onium salts (S, Se, Te), diallyl iodonium salts and the like. Initiators of this type are generally not selective with respect to the reaction temperature. Therefore, an epoxy resin containing these initiators begins to cure even at room temperature.

Japanese Patent Kokai (Laid Open) application Nos. 37003/83 and 37004/83 disclose another type of cationic polymerization initiators. They are aliphatic or aromatic sulfonium salts capable of generating carbonium cations upon heating to an elevated temperature. Initiators of this type are known as "heat-latent cationic polymerization initiator". U.S. patent application Ser. Nos. 07/356,903 and 07/532,716, both assigned to the assignee of this application, also disclose a heat-latent cationic polymerization initiator. Epoxy resins containing the heat-latent initiators are therefore normally non-reactive but capable of curing at a temperature above the cleaving temperature of the initiator. This provides a heat-curable, one-component epoxy resin composition having a greater storage stability and a longer pot life.

Epoxy resins or polymers used heretofore for this purpose are limited to glycidyl ether or ester epoxy resins, typically bisphenol A epoxy resins, and homo- and copolymers of glycidyl acrylate or methacrylate (hereinafter collectively referred to as "(meth)acrylate").

We have now found that acrylic polymers having a plurality of alicyclic epoxide functions are more sensitive to the cationic polymerization than glycidyl epoxy resins in the presence of a heat-latent cationic polymerization initiator. The present invention has its basis on this finding.

SUMMARY OF THE INVENTION

According to the present invention, there is provided a curable resin composition comprising:
(a) an acrylic polyer having a plurality of alycyclic epoxide functions and a mean molecular weight of greater than 1,000; and
(b) an amount effective to initiate the curing reaction of said acrylic polymer of a heat-latent cation polymerization initiator.

The composition may contain a polyfunctional alicyclic epoxide compound as a crosslinking agent and/or a polyol as a chain extender, and various conventional additives such as solvents, pigments, UV absorbers, and the like depending upon the end use of the composition.

The alicyclic epoxide functions possessed by the acrylic polymers used in the present inventions are more sensitive to the cationic polymerization reaction than glycidyl groups. Accordingly, the composition of this invention may be cured at a baking temperature lower than the temperature at which corresponding compositions comprising glycidyl epoxy resins can be cured.

DETAILED DISCUSSION

Acrylic Polymers Having Alicyclic Epoxide Functions

Acrylic polymers having alicyclic epoxide functions may be prepared by polymerizing or copolymerizing an acrylic monomer having an alicyclic epoxide function. The term "alicyclic epoxide function" as used herein refers to an epoxide bridge formed between two adjacent carbon atoms of an alicyclic ring. Examples of these acrylic monomers may be classified into the following three groups.

I. (Meth)acrylate esters such as:
3,4-epoxycyclohexylmethyl (meth)acrylate;
2-(1,2-epoxy-4,7-methano-perhydroinden-5(6)-yl)oxyethyl (meth)acrylate;
5,6-epoxy-4,7-methano-perhydroinden-2-yl (meth)acrylate:
1,2-epoxy-4,7-methano-perhydroinden-5-yl (meth)acrylate;
2,3-epoxycyclopentenylmethyl (methacrylate); and
3,4-epoxycyclohexylmethylated polycaprolactone (meth)acrylate of the formula:

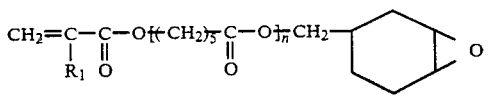

wherein
$R^1 = H$ or $CH_3$ and $n = 1-10$.

II. Adducts of (meth)acrylic acid with a polyfunctional alicyclic epoxy compound such as:
3,4-epoxycyclohexyloxirane of the formula:

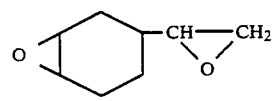

3',4'-epoxycyclohexylmethyl 3,4-epoxycyclohexanecarboxylate of the formula:

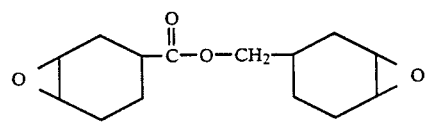

1,2,5,6-diepoxy-4,7-methano-perhydroindene of the formula:

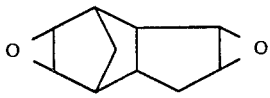

2-(3,4-epoxycyclohexyl)-3',4'-epoxy-1,3-dioxane-5-spirocyclohexane of the formula:

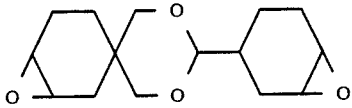

1,2-ethylenedioxy-bis(3,4-epoxycyclohexylmethane) of the formula:

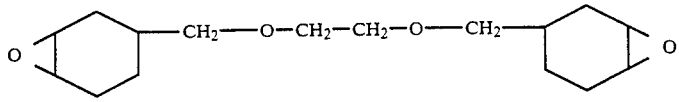

1,3-dimethyl-2,3-epoxycyclohexyloxirane of the formula:

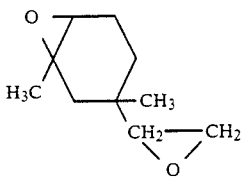

di-(2,3-epoxycyclopentyl)ether of the formula:

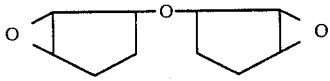

4',5'-epoxy-2'-methylcyclohexylmethyl 4,5-epoxy-2-methylcyclohexanecarboxylate of the formula:

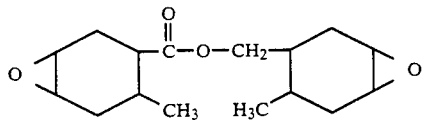

bis-(3,4-epoxycyclohexylmethyl)adipate;
bis-(4,5-epoxy-2-methylcyclohexylmethyl) adipate; and
ethyleneglycol bis (3,4-epoxycyclohexanecarboxylate).

III. Adduts of alicyclic epoxide alcohols with (meth)acrylisocyanate or isocyanotoethyl (meth)acrylate or m-isopropenyl-α,α-dimethylbenzylisocyanate such as:
N-(3,4-epoxycyclohexyl)methylcarbonyl-(meth)acrylamide;
N-(5,6-epoxy-4,7-methano-perhydroinden-2-yl)oxycarbonyl-(meth)acrylamide; and
adducts of 3,4-epoxycyclohexylmethylated polycaprolactone with (meth)acrylisocyanate of the formula:

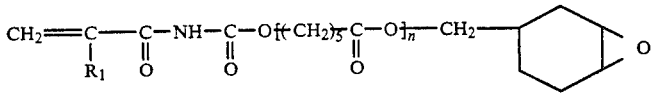

wherein
$R^1$ = H or $CH_3$ and n = 1-10.

The above acrylic monomers may preferably be copolymerized with other monomers free of the alicyclic epoxide function. Examples of such comonomers include non-alicyclic epoxy group-containing monomers such as glycidyl (meth)acrylate; hydroxyl group-containing monomers such as 2-hydroxyethyl (meth)acrylate, 3-hydroxypropyl (meth)acrylate, 4-hydroxybutyl (meth)acrylate, 4-hydroxystyrene, 2-(2-hydroxyethoxy)ethyl (meth)acrylate, N-(2-hydroxyethyl)acrylamide, reaction products of polycaprolactone with (meth)acrylic acid (PLACCEL FA and PLAGCEL FM sold by Daicel Chemical Industries, Ltd.), reaction products of polymethylvalerolactone with (meth)acrylic acid, polyethyleneglycol mono(meth)acrylate, polypropyleneglycol mono(meth)acrylate and polytetramethyleneglycol mono(meth)acrylate; and other monomers such as styrene, α-methylstyrene, methyl (meth)acrylate, ethyl (meth)acrylate, n-propyl (meth)acrylate, isopropyl (meth)acrylate, n-butyl (meth)acrylate, sec.-butyl (meth)acrylate, t-butyl (meth)acrylate, 2-ethylhexyl (meth)acrylate, lauryl (meth)acrylate stearyl (meth)acrylate, vinyl acetate, vinyl propionate and the like.

The polymerization may be carried out by the solution polymerization technique using a conventional radical polymerization initiator. Examples of solvents used in the solution polymerization include aliphatic hydrocarbons such as cyclohexane, dipentene and hexane; aromatic hydrocarbons such as benzene, toluene, ethylbenzene and aromatic petroleum naphtha; halogenated hydrocarbons such as dichloromethane, dichloroethane, carbon tetrachloride, chlorform and dichlorobenzene; nitrated hydrocarbons such as nitrobenzene, nitromethane and nitroethane; ethers such as dioxane, tetrahydrofuran, and dibutyl ether; glycol ethers such as ethyleneglycol monomethyl ether, ethyleneglycol monoethyl ether, ethyleneglycol monobutyl ether, ethyleneglycol monoethyl ether acetate, diethyleneglycol monomethyl ether diethyleneglycol monoethyl ether and diethyleneglycol monobuty ether; ketones such as methyl ethyl ketone, ethyl isobutyl ketone, cyclohexanone, acetone and isophorone; alcohols such as methanol, ethanol, isopropanol, n-propanol, butanol, 2-ethylhexanol and cyclohexanol; esters such as ethyl acetate and butyl acetate; and mixtures of these solvents.

The resulting acrylic polymer should have a number average molecular weight of greater than 1,000. The upper limit of molecular weight generally lies at about 500,000. A molecular weight ranging between about 3,000 and about 10,000 is preferable. If the molecular weight is too low, the mechanical strength of the resulting cured products is not satisfactory. Conversely, if the molecular weight is two high, the polymer is too viscous resulting in decrease workability of compositions containing the same.

Heat-Latent Cationic Polymerization Initiators

A variety of heat-latent cation polymerization initiators is known. For example, initiators of sulfonium salt type have been disclosed in Endo et al., J. Polym. Sci., Polym. Lett. Ed., 23, 359 (1985), Japanese Patent Kokai Nos. 37003/83 and 37004/83. Other initiators of benzylpyridinium salt, benzylammonium salt, and heterocyclic ammonium salt-types have been disclosed in Sang-Bong Lee et al., Polym. Prep. Jpn., 38, 271 (1989) and U.S. patent application Ser. Nos. 07/356,903 and 07/532,716, both assigned to the assignee of this application. The disclosures of these references are incorporated herein by reference. Phosphonium salt- and iodonium salt-type heat-latent initiators are also known. Any of these known heat-latent initiators may be used in the present invention. Generally speaking, the heat-latent initiators are onium salts of nitrogen, sulfur, phosphorus and iodine with a $SbF_6^-$, $BF_4^-$, $AsF_6^-$, $PF_6^-$ or $CF_3SO_3^-$ anion.

Specific examples thereof include:
N,N-diemethyl-N-benzylanilinium hexafluoroantimonate,
N,N-diethyl-N-benzylanilinium tetrafluoroborate,
N-(2,3-dimethylbenzyl)pyridinium hexafluoroantimonate,
N-(2,3-dimethylbenzyl)pyridinium hexafluoroantimonate,
N-(2,3-diethylbenzyl)pyridinium trifluoromethane-sulfonate,
N,N-dimethyl-N-(4-methoxybenzyl)anilinium hexafluoroantimonate,
N,N-diethyl-N-(4-methoxybenzyl)anilinium hexafluoroantimonate,
N,N-diethyl-N-(4-methoxybenzyl)-N-p-tolylammonium hexafluoroantimonate,
N,N-dimethyl-N-(4-methoxybenzyl)-N-p-tolylammonium hexafluoroantimonate,
triphenylsulfonium tetrafluoroborate,
triphenylsulfonium hexafluoroantimonate,
triphenylsulfonium hexafluoroarsenate,
ADEKA CP-66 (Asahi Denka Kogyo K.K.),
ADEKA CP-77 (Asahi Denka Kogyo K.K.),
tri-(4-methoxyphenyl)sulfonium hexafluoroarsenate,
diphenyl-(4-phenylthiophenyl)sulfonium hexafluoroantimonate,
ethyltriphenylphosphonium hexafluoroantimonate,
tetrabutylphosphonium hexafluoroantimonate,
diphenyliodonium hexafluoroarsenate,
di-4-chlorophenyliodonium hexafluoroarsenate,
di-4-bromophenyliodonium hexafluoroarsenate,
di-p-tolyliodonium hexafluoroarsenate, and
phenyl-(4-methoxyphenyl)iodonium hexafluoroarsenate.

Heat-Curable Resin Compositions

The heat curable resin composition of this invention contains an amount of a heat-latent cation polymerization initiator effective to initiate the polymerization reaction upon heating of the alicyclic epoxy acrylic polymers. This amount varies with particular initiators and polymers used but generally ranges from about 0.1 to 10%, preferably from 0.3 to 5% by weight relative to the nonvolatile content of the acrylic polymer. Excessive use of the initiator should be avoided since it may adversely affect the properties of the resulting cured products such as water resistance, color and the like. Excessive addition of heat-latent initiators may also have an adverse affect on the storage stability of the composition.

When the alicyclic epoxy acrylic polymer has a plurality of hydroxyl groups, the composition of this invention may comprise a polyfuctional alicyclic epoxide compound as used in the preparation of group II of acrylic monomers having an alicyclic epoxide function as a crosslinking agent which serves as a reactive diluent as well. The amount of such polyfunctional alicyclic epoxide compounds should be, when used, equal or less than the equivalent relative to the hydroxyl number of the acrylic polymer.

The composition of this invention may also comprise, as a chain extender, a low molecular weight-polyol such as ethylene glycol, diethylene glycol, propylene glycol, neopentyl glycol, 1,4-butanediol, pentaerythritol and trimethylolpropane, or a high molecular weight-polyol such as polyether polyols, polyester polyols and polycaprolactone polyols. The amount of such polyols should be, of course, such that not all alicyclic epoxide functions of the acrylic polymer will be consumed in the reaction with the chain extender.

The composition of the present invention may contain a variety of conventional additives depending upon its end use. For example, the composition for coating purposes may contain a conventional solvent, pigment, UV absorber such as 2-(2'-hydroxyphenyl)benzotriazole or its derivative or 2-hydroxybenzophenone, surface conditioner and the like.

The following examples are intended to further illustrate the present invention without limiting thereto. All parts and percents therein are by weight unless otherwise indicated.

PRODUCTION EXAMPLE 1

3,4-Epoxycyclohexylmethyl methacrylate

Step A

A 4 liter, 4 necked flask equipped with a Vigreaux column, thermometer, nitrogen gas tube and vacuum sealer was charged with 1802 g of methyl methacrylate, 841.3 g of cyclohexen-4-ylmethanol, 52.8 g of hydroquinone and 26.4 g of p-toluenesulfonic acid. The reactants were stirred while blowing nitrogen gas at a bath temperature of 100° C. until a distillate began to flow out from the column. Then the bath temperature was raised gradually while maintaining the top temperature of the column below 70° C. The reaction was continued for additional 6 hours and then stopped when the bath temperature was 120° C. 605 g of the distillate was collected. Then the reaction mixture was distilled under vacuum to remove unreacted methyl methacrylate and the resulting cyclohexen-4-ylmethyl methacrylate was purified by fractional distillatin under reduced pressure. Yield, 1279 g (94.6% of theory), b.p. 67° C./0.2 mmHg.

Step B

A 8 liter, 4 necked flask equipped with a thermometer, cooling jacket, stirring means and drip funnel was charged with 200 g of cyclohexen-4-ylmethyl methacrylate produced in Step A and 1200 ml of methylene chloride. The reactants were cooled to a temperature below 10° C. A solution of 268.6 g of m-chloroperbenzoic acid (80% purity, Kishida Chemicals) in 2800 ml of methylene chloride was added thereto dropwise over 3 hours and then allowed to react for additional 3 hours with stirring. After the reaction, an amount of 10% aqueous solution of sodium sulfite was added to the reaction mixture and allowed to react at room temperature for 1 hour to decompose unreacted perbenzoate. After having confirmed the absence of perbenzoate using starch-iodine indicator paper, the reaction mixture was washed with 1000 ml of an aqueous solution containing 81 g of sodium carbonate and then with an amount of saline successively. Thereafter the mixture was dried over magnesium sulfate and evaporated under reduced pressure with addition of 40 mg of p-methoxyquinone as a polymerization inhibitor to remove the solvent. 206 g of crude product of the titled compound was obtained. Yield: 95% of theory.

1H-NMR (in CDCl3, TMS standard, ppm), 1.4-2.4 (m, 7H); 3.15, 3.19 (m, 2H); 3.92, 3.96 (d, 2H); 5.55(s, 1H); 6.09 (s, 1H)

PRODUCTION EXAMPLE 2

5,6-Epoxy-4,7-Methano-Perhydroinden-2-yl Methacrylate

A 3 liter, 4 necked flask equipped with a thermometer, cooling jacket, stirring means and drip funnel was charged with 166 g of 5,6-epoxy-2-hydroxy-4,7-methanoperhydroindene (CELOXIDE 4000, Daicel Chemical Industries, Ltd.), 87.01 g of pyridine and 1000 ml of benzene. To this was added a mixture of 104, 54 g of methacryloyl chloride and 100 ml of benzene dropwise over 2 hours while keeping the inner temperature at 10° C. After the addition the reaction mixture was stirred for 3 hours at room temperature. After having confirmed the absence of the acid chloride by IR spectrometrically, the reaction mixture was filtered to remove solids washed with an amount of 5% aqueous solution of sodium carbonate, dried over magnesium sulfate, and evaporated under reduced pressure with addition of 40 mg of p-methoxyquinone to remove the solvent. 199 g (85% of theory) of a crude product of the title compound was obtained.

Structural formula:

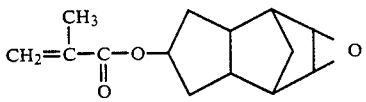

PRODUCTION EXAMPLE 3

2-(1,2-Epoxy-4,7-Methano-Perhydroinden-5(6)-yl)oxymethyl methacrylate

A 3 liter, 4 necked flask equipped with a thermometer, cooling jacket, stirring means and drip funnel was charged with 555 ml of methylene chloride and 95.7 g of 2-(4,7-methano-3a,4,5,6,7,7a-hexahydroinden-5(6)-yl)oxyethyl methacrylate (QM 657, Rohm and Haas) of the formula:

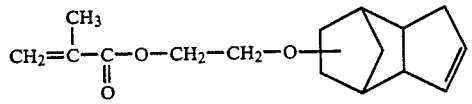

To this was added dropwise a solution of 87 g of m-chloroperbenzoic acid (80% purity, Kishida Chemical) in 888 ml of methylene chloride over 1 hour while keeping the inner temperature at 10° C. and then allowed to react for additional 3 hours with stirring. After the reaction, an amount of aqueous solution of sodium sulfite was added to the reaction mixture and allowed to react at room temperature for 1 hour with stirring to decompose unreacted perbenzoate. After having confirmed the absence of perbenzoate using starch-iodine indicater paper, the reaction mixture was washed with a 5% aqueous solution of sodium carbonate and saline successively, dried over magnesium sulfate, and then evaporated under reduced pressure to remove the solvent. 103.8 g of the title compound was obtained almost in a quantitative yield.

Structural formula:

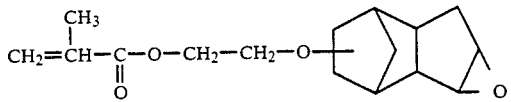

PRODUCTION EXAMPLES 4-10

Acrylic Polymers Having Alicyclic Epoxide Functions 450 g of xylene placed in a 2 liter, 4 necked flask equipped with a thermometer, drip funnel and stirring means was heated to 130° C. To this was added dropwise Mixture #1 shown in Table 1 below over 3 hours. Thereafter the mixture was stirred for 30 minutes at 130° C. Then Mixture #2 shown in Table 1 was added dropwise over 30 minutes and stirring was continued for additional 1.5 hours at 130° C. After cooling, a viscous, colorless and transparent solution of an acrylic polymer, was obtained. The nonvolatile content of the solution and the number average molecular weight of the polymer are also Given in Table 1.

TABLE 1

| | PRODUCTION EXAMPLE | | | | | | |
|---|---|---|---|---|---|---|---|
| | 4 | 5 | 6 | 7 | 8 | 9 | 10 |
| Mixture #1, parts | | | | | | | |
| Monomer of Production Ex. 1 | 500 | | 500 | | | | |
| Monomer of Production Ex. 2 | | | | | 580 | | |
| Monomer of Production Ex. 3 | | | | | | 670 | |
| GMA[1] | | 500 | | 500 | | | |
| HEMA[2] | 93 | 93 | | | 50 | 50 | 273 |
| ST[3] | 167 | 167 | | | | | |

TABLE 1-continued

| | PRODUCTION EXAMPLE | | | | | | |
|---|---|---|---|---|---|---|---|
| | 4 | 5 | 6 | 7 | 8 | 9 | 10 |
| NBA[4] | 240 | 240 | | | 220 | 180 | 341 |
| 2 EHA[5] | | | 120 | 120 | | | |
| MMA[6] | | | 380 | 380 | 150 | 100 | 380 |
| Xylene | 450 | 450 | 450 | 450 | 912 | 912 | 912 |
| Initiator[7] | 100 | 100 | 100 | 100 | 50 | 50 | 50 |
| Mixture #2 | | | | | | | |
| Xylene | 88 | 88 | 88 | 88 | 88 | 88 | 88 |
| Initiator[7] | 5 | 5 | 5 | 5 | 3 | 3 | 3 |
| Properties | | | | | | | |
| Mn | 3200 | 3100 | 3300 | 3500 | 8500 | 8200 | 8300 |
| Nonvolatile, % | 65 | 65 | 65 | 65 | 50 | 50 | 50 |

Remarks:
[1] Glycidyl methacrylate
[2] 2-Hydroxyethyl methacrylate
[3] Styrene
[4] n-Butyl acrylate
[5] 2-Ethylhexyl acrylate
[6] Methyl methacrylate
[7] t-Butyl peroctate

EXAMPLES 1-3 AND COMPARATIVE EXAMPLES 1-2

Various coating compositions were formulated using varnishes and other components as shown in Table 2 below. The heat-latent initiator used was N-(4-methoxybenzyl)-N,N-dimethylanilinium hexafluoroantimonate. The compositions were each applied on a tinplate with a bar coater at a dry film thickness of 20 microns, and backed at 110° C. for 30 minutes. The resulting cured films were evaluated for solvent resistance and smoothness. The results are also shown in Table 2.

TABLE 2

| | EXAMPLES | | | COM. EXAMPLES | |
|---|---|---|---|---|---|
| | 1 | 2 | 3 | 1 | 2 |
| Components, parts | | | | | |
| Varnish of Pro. Ex. 6 | 100 | 80 | 80 | | |
| Varnish of Pro. Ex. 7 | | | | 100 | |
| Varnish of Pro. Ex. 10 | | 20 | | | |
| CELOXIDE 2021[8] | | | 20 | 100 | |
| Heat latent initiator | 1 | 1 | 1 | 1 | 1 |
| Evaluation | | | | | |
| Solvent resistance[9] | Good | Good | Good | Good | Not good |
| Smoothness[10] | Good | Good | Good | Not good | Good |

Remarks:
[8] Alicyclic epoxide compound sold by Daicel Chemical Industries, Ltd.
[9] Rubbing test with xylene-impregnated fabric at 20 reciprocations.
Good: No change.
Not Good: Dissolved or peeled off.
[10] Visual judgement.
Good: Continuously flat surface with high gloss.
Not Good: Uneven surface or no gloss.

EXAMPLES 4-6 AND COMPARATIVE EXAMPLE 3

Various coating compositions were formulate using varnishes and other components as shown in Table 3 below. The heat-latent initiator used was a sulfonium compound ADEKA CP-77 (Asahi Denka Kogyo K.K.). The compositions were each applied on a tinplate with a bar coater at a dry film thickness of 20 microns, and baked at 110° C. for 30 minutes. The resulting cured films were evaluated for solvent resistance and smoothness. The results are also shown in Table 3.

TABLE 3

| | EXAMPLES | | | COM. EXAMPLES |
|---|---|---|---|---|
| | 4 | 5 | 6 | 3 |
| Components, parts | | | | |
| Varnish of Pro. Ex. 4 | 100 | | | |
| Varnish of Pro. Ex. 5 | | 100 | | |
| Varnish of Pro. Ex. 7 | | | | 100 |
| Varnish of Pro. Ex. 9 | | | 100 | |
| Heat latentinitiator | 1 | 1 | 1 | 1 |
| Evaluation | | | | |
| Solvent resistance | Good | Good | Good | Not good |
| Smoothness | Good | Good | Good | Good |

What is claimed is:

1. A curable resin composition comprising:
   (a) an acrylic polymer having a plurality of alicyclic epoxide functions and a plurality of hydroxyl functions produced by copolymerizing a monomer mixture comprising an acrylic monomer having at least one alicyclic epoxide function and a hydroxyl group-containing monomer;
   (b) an amount of a polyfunctional alicyclic epoxide compound equal to or less than the equivalent relative to the hydroxyl number of said acrylic polymer; and
   (c) an amount of heat-latent cationic polymerization initiator effective to initiate a cationic polymerization reaction of said acrylic polymer upon heating.

2. The cationic polymerizable resin composition of claim 1, wherein said acrylic polymer has a mean molecular weight between about 3,000 and 10,000.

3. The curable resin composition of claim 1, wherein said monomer mixture further contains an ethylenically unsaturated monomer free of said alicyclic epoxide function and said hydroxyl group.

4. The cationic polymerizable resin composition of claim 3, wherein said acrylic monomer having at least one alicyclic epoxide function is an acrylate or methacrylate ester of an epoxide alicyclic alcohol, a reaction product of a polyfunctional alicyclic epoxy compound with acrylic or methacrylic acid, or an adduct of an epoxidized alicyclic alcohol with an isocyanate of an acrylic monomer.

5. The curable resin composition of claim 1, wherein said hydroxyl group-containing monomer is a hydroxylalkyl acrylate or methacrylate, a reaction product of polycaprolactone with acrylic or methacrylic acid, a reaction product of polymethylvalerolactone with acrylic or methacrylic acid, a polyalkylene glycol monoacrylate or monomethacrylate, 4-hydroxystyrene or N-(2-hydroxyethyl)-arylamide.

6. The curable resin composition as claimed in claim 1 further comprising, as a chain extender, a polyol in such an amount that not all alicyclic epoxide function of said acrylic polymer will be consumed in the reaction with said polyol.

7. The curable resin composition as claimed in claim 1, wherein said heat-latent cation polymerization initiator is an onium salt of nitrogen, sulfur, phosphorus or iodine with a $SbF_6^-$, $BF_4^-$, $PF_6^-$, or $CF_3SO_3^-$ anion.

* * * * *